United States Patent
Ibrahim et al.

(10) Patent No.: US 11,050,741 B2
(45) Date of Patent: *Jun. 29, 2021

(54) APPLYING A FUNCTION TO A PASSWORD TO DETERMINE AN EXPECTED RESPONSE

(71) Applicant: American Express Travel Related Services Company, Inc., New York, NY (US)

(72) Inventors: Wael Ibrahim, San Diego, CA (US); Upendra Mardikar, San Diego, CA (US)

(73) Assignee: American Express Travel Related Services Company, Inc., New York, NY (US)

(*) Notice: Subject to any disclaimer, the term of this patent is extended or adjusted under 35 U.S.C. 154(b) by 6 days.

This patent is subject to a terminal disclaimer.

(21) Appl. No.: 16/387,751

(22) Filed: Apr. 18, 2019

(65) Prior Publication Data

US 2019/0253412 A1     Aug. 15, 2019

Related U.S. Application Data

(63) Continuation of application No. 15/680,585, filed on Aug. 18, 2017, now Pat. No. 10,313,333, which is a
(Continued)

(51) Int. Cl.
| | |
|---|---|
| *H04L 9/32* | (2006.01) |
| *H04L 9/22* | (2006.01) |
| *H04L 29/06* | (2006.01) |
| *G06Q 20/38* | (2012.01) |
| *H04L 9/34* | (2006.01) |
| *G06Q 20/00* | (2012.01) |

(52) U.S. Cl.
CPC ....... *H04L 63/0838* (2013.01); *G06Q 20/385* (2013.01); *G06Q 20/00* (2013.01); *H04L 63/0876* (2013.01); *H04L 63/10* (2013.01)

(58) Field of Classification Search
None
See application file for complete search history.

(56) References Cited

U.S. PATENT DOCUMENTS

| | | |
|---|---|---|
| 7,818,791 B2 | 10/2010 | Cheng |
| 8,412,928 B1 | 4/2013 | Bowness |

(Continued)

FOREIGN PATENT DOCUMENTS

| | | |
|---|---|---|
| GB | 2467975 | 8/2010 |

OTHER PUBLICATIONS

International Search Report and Written Opinion dated Oct. 24, 2016 in Application No. PCT/US2016/047385.
(Continued)

*Primary Examiner* — Venkat Perungavoor
(74) *Attorney, Agent, or Firm* — Thomas | Horstemeyer, LLP

(57) ABSTRACT

A system may generate a seed one-time password (OTP). The system may also perform steps including transmitting the seed OTP to a user device, receiving a response OTP from the user device, and calculating an expected response OTP by applying a function to the seed OTP. The system may then compare the response OTP to the expected response OTP and send a result in response to comparing the response OTP to the expected response OTP.

20 Claims, 7 Drawing Sheets

Related U.S. Application Data continuation of application No. 14/860,420, filed on Sep. 21, 2015, now Pat. No. 9,769,157.

(56) References Cited

U.S. PATENT DOCUMENTS

| | | | | |
|---|---|---|---|---|
| 8,832,807 | B1* | 9/2014 | Kuo | H04L 9/3228 |
| | | | | 726/6 |
| 9,218,476 | B1* | 12/2015 | Roth | H04L 63/0838 |
| 10,523,664 | B2* | 12/2019 | Li | H04L 9/3228 |
| 2003/0080183 | A1* | 5/2003 | Rajasekaran | G06Q 20/04 |
| | | | | 235/379 |
| 2007/0005963 | A1 | 1/2007 | Eldar | |
| 2008/0072303 | A1 | 3/2008 | Syed | |
| 2009/0235339 | A1 | 9/2009 | Mennes | |
| 2009/0328182 | A1 | 12/2009 | Malakapalli et al. | |
| 2010/0284565 | A1 | 11/2010 | Benkley | |
| 2010/0299729 | A1* | 11/2010 | Wallace | H04L 63/08 |
| | | | | 726/5 |
| 2013/0047223 | A1 | 2/2013 | Headley | |
| 2013/0191899 | A1* | 7/2013 | Eldefrawy | H04L 9/3236 |
| | | | | 726/6 |
| 2014/0115341 | A1 | 4/2014 | Robertson | |
| 2014/0250490 | A1 | 9/2014 | Beca et al. | |
| 2014/0270414 | A1 | 9/2014 | Slaby | |
| 2014/0365780 | A1 | 12/2014 | Movassaghi | |
| 2014/0369572 | A1 | 12/2014 | Setlak | |
| 2015/0169860 | A1 | 6/2015 | Kim | |
| 2015/0261692 | A1 | 9/2015 | Benedetti | |
| 2015/0326402 | A1* | 11/2015 | Sibert | H04L 9/3236 |
| | | | | 713/155 |
| 2015/0339670 | A1 | 11/2015 | Shaked | |
| 2015/0365402 | A1* | 12/2015 | Woo | H04L 63/067 |
| | | | | 726/6 |
| 2018/0019994 | A1* | 1/2018 | Chang | G06F 21/32 |

OTHER PUBLICATIONS

Hea Suk Jo and Hee Yong Youn; A Secure User Authentication Protocol Based on One-Time-Password for Home Network; ICCSA 2005, LNCS 3480, pp. 519-528, 2005. Springer-Verlag Berlin Heidelberg.

Tan Teik Guan; An Enhanced One-Time Password Implementation; Data Security Systems Solutions Pte Ltd, Singapore http://www.dsssasia.com.

USPTO; Office Action dated Mar. 10, 2017 in U.S. Appl. No. 14/860,420.

USPTO; Notice of Allowance dated Jul. 25, 2017 in U.S. Appl. No. 14/860,420.

International Preliminary Report on Patentability dated Jan. 8, 2018 in International Application No. PCT/US16/47385.

USPTO; Non-Final Office Action dated Mar. 29, 2018 in U.S. Appl. No. 15/680,585.

USPTO; Final Office Action dated Aug. 15, 2018 in U.S. Appl. No. 15/680,585.

USPTO; Advisory Action dated Oct. 12, 2018 in U.S. Appl. No. 15/680,585.

USPTO; Notice of Allowance dated Feb. 6, 2019 in U.S. Appl. No. 15/680,585.

KR 20140106360. Englsih Translation. Estorm Co. Ltd. (Year: 2014).

USPTO; Non-Final Office Action dated Jun. 15, 2018 in U.S. Appl. No. 14/860,375.

Non-Final Office Action dated Sep. 3, 2019 in U.S. Appl. No. 16/213,335.

\* cited by examiner

APPLYING A FUNCTION TO A PASSWORD TO DETERMINE AN EXPECTED RESPONSE

CROSS-REFERENCE TO RELATED APPLICATIONS

This application is a continuation of, claims priority to and the benefit of, U.S. Ser. No. 15/680,585 filed Aug. 18, 2017 and entitled "EXPECTED RESPONSE ONE-TIME PASSWORD." The '585 application is a continuation of, claims priority to and the benefit of, U.S. Pat. No. 9,769,157 which issued Sep. 19, 2017 (aka U.S. Ser. No. 14/860,420 filed Sep. 21, 2015) and entitled "SYSTEMS AND METHODS FOR SECURE ONE-TIME PASSWORD VALIDATION." Both of which are hereby incorporated herein in their entirety for all purposes.

FIELD

The present disclosure relates to information security based on one-time passwords.

BACKGROUND

User authentication systems play an important security role in data protection, as sensitive data is increasingly stored behind electronic authentication walls. Mobile devices, computers, and secure rooms may all be protected by various types of authentication. Many mobile devices may authenticate users using a one-time password as part of a multi-factored approach, for example. The one-time passwords are often short numbers generated securely and sent to a user via text message or email for entry into a web form. The entry of the correct number verifies possession of the registered mobile device and the user is then validated.

Typical one-time passwords have limitations ranging from user inconveniences to high-risk vulnerabilities that have been exposed in the past. Users may enter the one-time password manually into a web form or application to verify receipt, a process subject to the inconvenience of typographical errors. Similarly, users that do not regularly delete earlier one-time passwords may select an incorrect one-time password for entry. One-time passwords are also relatively short in many cases (e.g., four to six digits). Short one-time passwords may pose security risks as the number may be more easily guessed. Additionally, one-time passwords may be subject to attacks by stingray or malware that can enable attackers to retrieve the one-time password from the user device before the user knows the key is present. Traditional one-time passwords may also be vulnerable to man-in-the-middle (MIM) attacks where an attacker intercepts the one-time password and changes parameters of the interaction before forwarding the altered payload along with the one-time password. OTP sent via text message also may not include a source identifier, as the OTP is sent without a return phone number, a provider name, a url, or other indicator of where the OTP came from.

SUMMARY

A system, method, and computer readable medium (collectively, the "system") is disclosed for one-time password authentication with improved user experience and increased security. The system may comprise generating a seed one-time password (OTP), transmitting the seed OTP to a user device, receiving a response OTP from the user device, and calculating an expected response OTP by applying a function to the seed OTP. The system may also compare the response OTP to the expected response OTP and send a result in response to comparing the response OTP to the expected response OTP. This may create a challenge/response type operation rather than the traditional OTP implementation.

In various embodiments, the seed OTP may be device-bound to the user device. In that regard, the expected response OTP may also be generated using a device fingerprint of the user device. The response OTP may be calculated by a user device by applying the function to the seed OTP. The response OTP may further be transmitted by a user device to the processor in response to an authorization button being pressed. The seed OTP may be transmitted to the user device with an authorization payload including at least one of a service identifier, a purpose, a time, a date, a merchant identifier, or an amount of the seed OTP for display with the authorization button. The result may include a success indicator in response to the response OTP matching the expected response OTP.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. For example, a first fingerprint template may match a second fingerprint template in response to the templates being sufficiently similar even though the fingerprint templates are not identical. Similarly, as used herein, "authenticate" or similar terms may include an exact authentication, a partial authentication, authenticating a subset of data, a correspondence, satisfying certain criteria, an association, an algorithmic relationship and/or the like.

Figure 1:
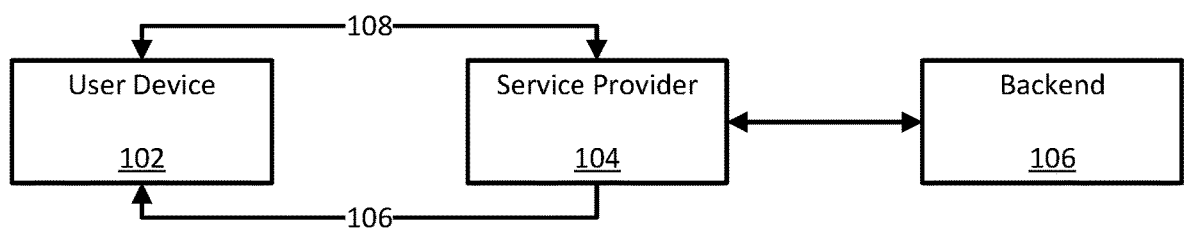
FIG. 1 illustrates an exemplary authentication system using one-time password (OTP) communication, in accordance with various embodiments.

With reference to FIG. 1, system 100 for OTP authentication and communication is shown, in accordance with various embodiments. System 100 may use a primary communication band and a secondary communication band different from the primary communication band. In that regard, system 100 may rely on out-of-band communication to deliver a OTP to a targeted device. For example, user device 102 may be in electronic communication with service provider 104 over network 108.

User device 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 108 and secondary network 110.

In various embodiments, network 108 may be a primary communication band comprising a private LAN network, the Internet, a cellular network, near field communication (NFC), a radio frequency (RF), and/or any suitable electronic communication channel. Network 108 may also facilitate communication among the parties via other suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboards, mice and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure, thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

In various embodiments, user device 102 may also be in electronic communication with service provider 104 over a secondary network 110. Secondary network 110 may comprise the same or different communication channels than network 108 including one or more of a private LAN network, the Internet, a cellular network, near field communication (NFC), a radio frequency (RF), and/or any suitable communication channel. For example, user device 102 may be in communication with service providers via network 108 (e.g., the Internet) to send and receive data regarding a service, and user device 102 may also be in communication with service providers 104 via secondary network 110 (e.g., text message over a cellular network) to receive and/or send an OTP for authorization. In that regard, network 108 and secondary network 110 may use different communication channels.

In various embodiments, service providers 104 may provide multiple services including at least one secure service and at least one authorization service. For example, service providers may provide access to individual identifying data, banking data, health data, financial data, or any other private data tied to a user or organization. Service provider 104 may further provide an authorization service using the OTP system. In that regard, system 100 may provide secure access to sensitive data and/or data manipulation access.

Figure 2:
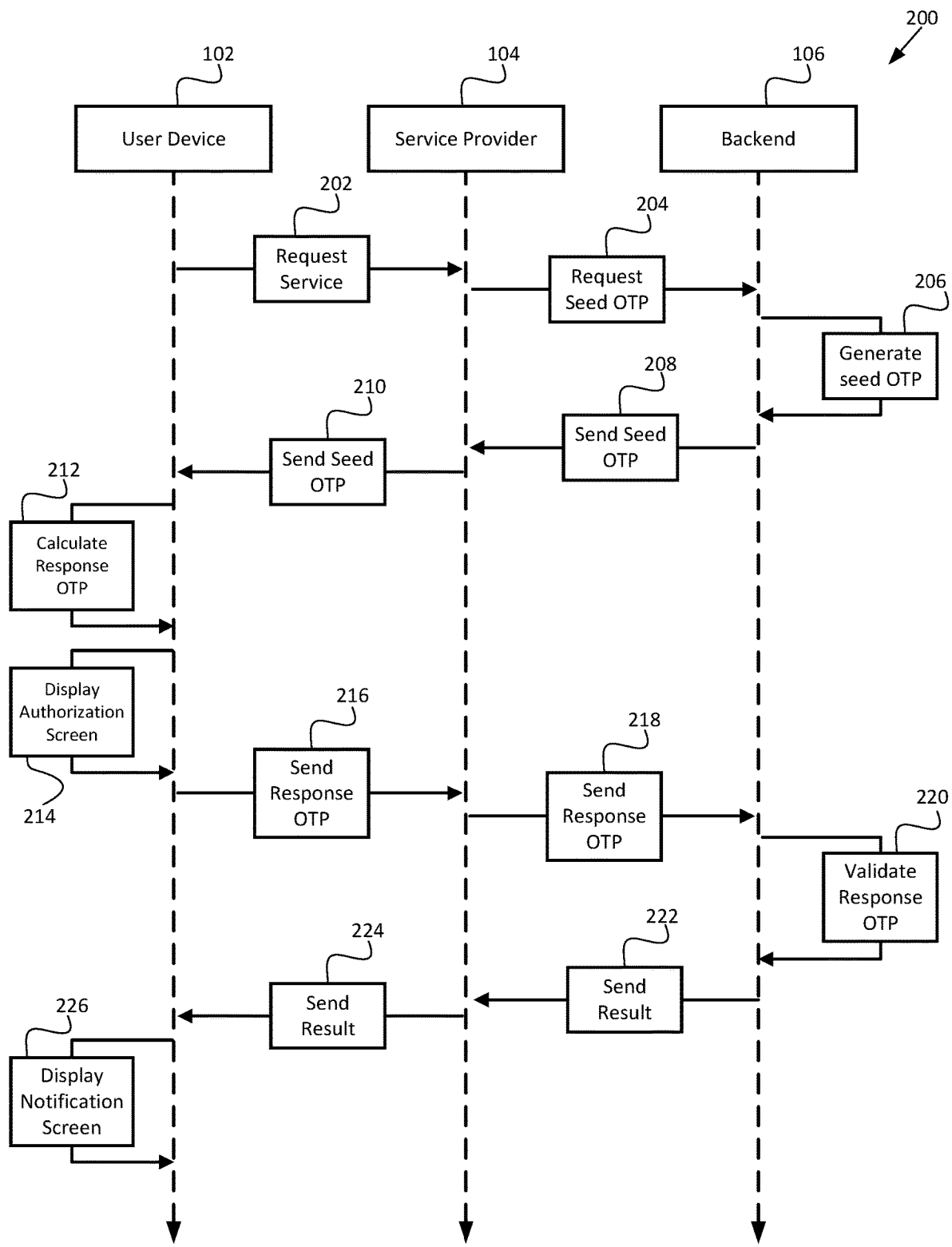
FIG. 2 illustrates an exemplary sequence diagram of processing and communication for OTP communication and authorization, in accordance with various embodiments.

With reference to FIG. 2, a sequence diagram 200 of actions between user device 102, service provider 104, and backend 106 for providing secure access on user device 102 using one-time passwords is shown, in accordance with various embodiments. Although service provider 104 and backend 106 are illustrated separately, service provider 104 and backend 106 may appear as a single entity to user device 102 and, in various embodiments, may be executed by individual servers or the same server. User device 102 may begin the authorization process by requesting service (Block 202) or otherwise initiating a service or application that limits access using an OTP. The service request may include device identifying information such as a device ID and/or a device fingerprint. The device ID and device fingerprint may be unique identifiers of user device 102 that tend to establish possession of a known device when used in communication.

In various embodiments, user device 102 may send the request to service provider 104. Service provider 104 may maintain, host, operate, and/or communicate with backend 106 protected from external networks behind a firewall with limited external access. Backend 106 may also be isolated from external networks by being placed on a separate internal network tier from components with external access (i.e., Internet access). Service provider 104 may request a seed OTP (Block 204) from backend 106. The request may include the device ID and/or device fingerprint received from user device 102. Backend 106 may generate seed OTPs and verify response OTPs in response to the request from service provider 104. In that regard, backend 106 may securely authorize known user device 102 accessing sensitive information.

In various embodiments, backend 106 may generate seed OTP (Block 206). The seed OTP may be generated using a random number returned by a random number generator. The seed OTP may be any number of bits in length with greater lengths tending to increase security. For example, a shorter seed OTP may be 128 bytes in length while a longer seed OTP might be 2,002 bytes in length. Backend 106 may send seed OTP (Block 208) to service provider 104, which may then send seed OTP (Block 210) to user device 102.

In various embodiments, user device 102 may then calculate a response OTP (Block 212). The response OTP may be calculated from the seed OTP using an algorithm or function known by user device 102 and backend 106 that relies in some part on the device ID and/or device fingerprint of user device 102. User device 102 and backend 106 may thus independently generate the same response OTP from the same seed OTP and device ID and/or device fingerprint using the same algorithm for authentication. For example, the response OTP may be a device ID concatenated with the seed OTP. A response OTP may also be a hash of the device fingerprint and OTP.

Figure 3:
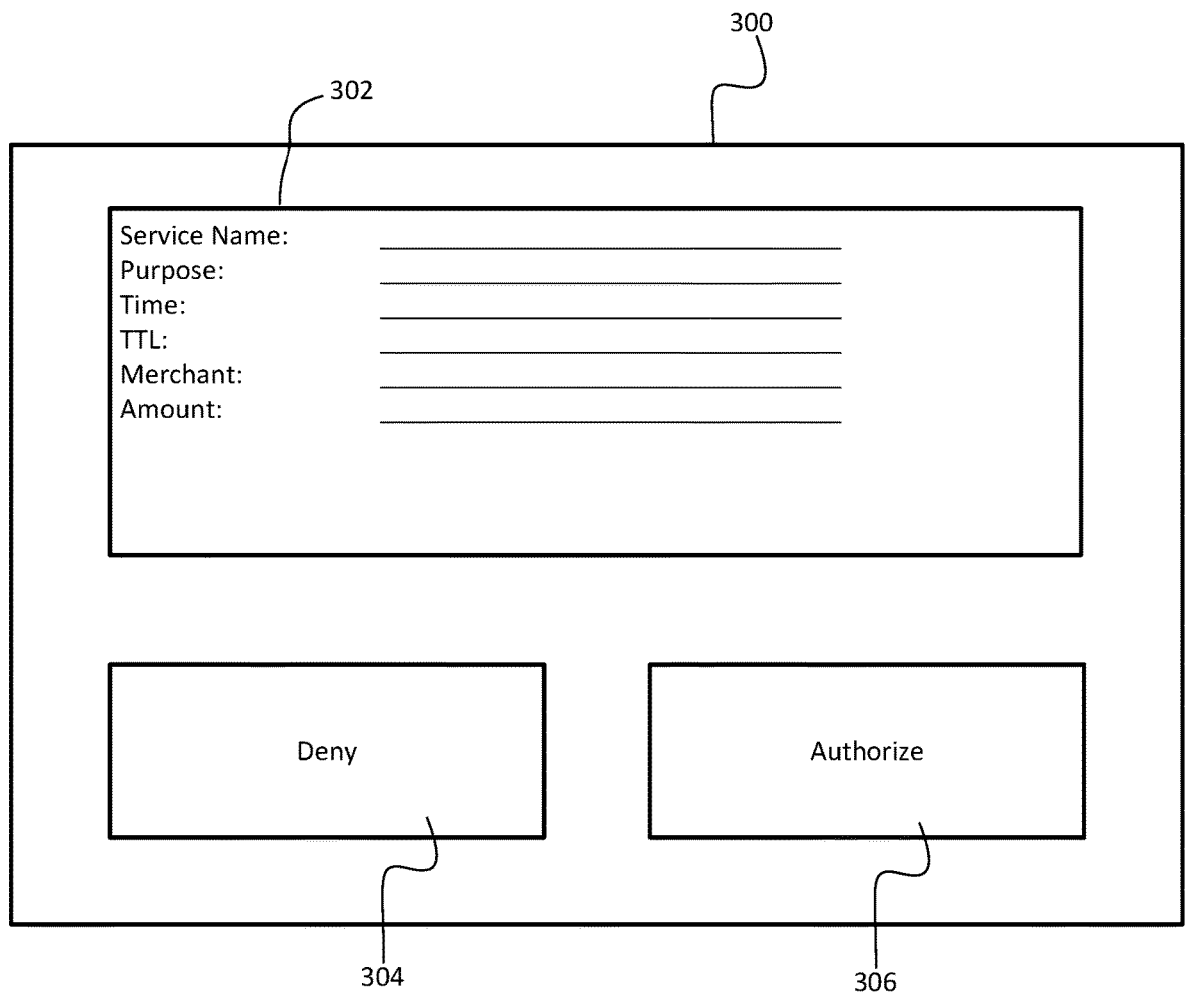
FIG. 3 illustrates an exemplary authorization screen for user approval of OTP authentication, in accordance with various embodiments.

In various embodiments, user device 102 may display an authorization screen (Block 214). With brief reference to FIG. 3, authorization screen 300 may comprise service details 302 for a user to review and approve. Service details 302 may identify the service provider and interaction type requesting OTP authorization. For example, service details 302 may comprise a service identifier, a purpose, a time, a date, a merchant identifier, an amount, and/or other suitable service details for display with an authorization button. The user may select deny button 304 to prevent user device 102 from completing the OTP validation. The user may also select authorization button 306 to authorize completion of the OTP validation. In response to the user selecting authorization button 306, a response payload may be sent, along with the response OTP, for transaction validation in response to a user authorizing a transaction. The authorization screen may inform a user and allow for user approval of the OTP authentication without copying and entering an OTP by hand. Thus, OTPs may be made longer (i.e., more secure) and more convenient (i.e., push button rather than copying) for users.

Returning to FIG. 2, in various embodiments, user device 102 may send a response OTP (Block 216) to service provider 104. Service provider 104 may then send the response OTP to backend 106 (Block 218). Backend 106 may validate the response OTP (Block 220). The response OTP may be validated by comparing the response OTP to an expected response OTP. The expected response OTP may be generated from the seed OTP using the same known function that user device 102 used to generate the response OTP. The validation may succeed in response to the expected response OTP matching the response OTP. The validation may fail in response to the expected response OTP calculated by backend 106 not matching the response OTP generated by user device 102.

Figure 4:
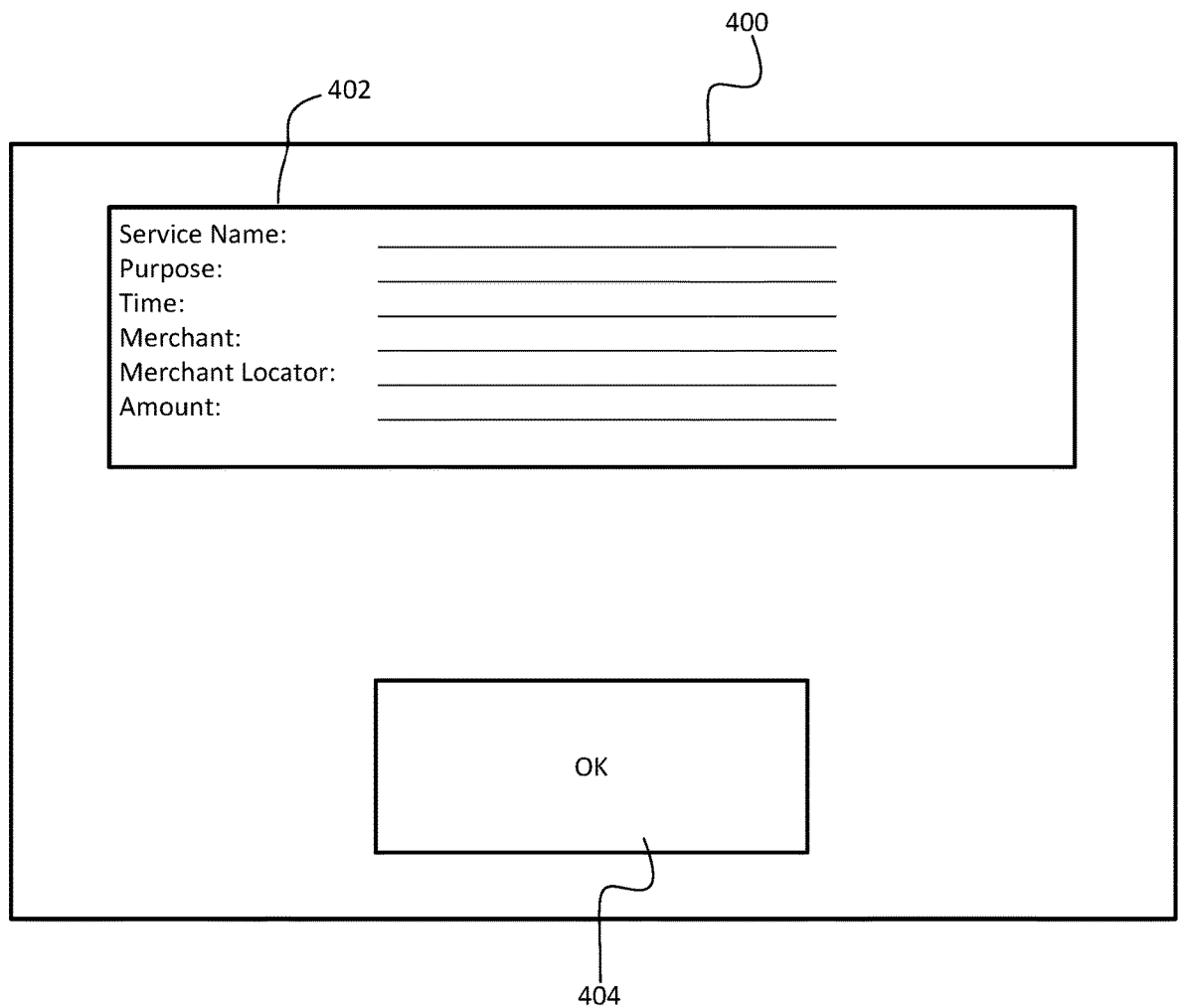
FIG. 4 illustrates an exemplary authentication success notification screen, in accordance with various embodiments.

In various embodiments, backend 106 may send the result (Block 222) to outward facing servers of service provider 104. Service provider 104 may then send the result to user device 102 (Block 224). User device 102 may display a notification screen in response to receiving the result of the OTP response validation. With reference to FIG. 4, an exemplary success notification screen 400 is shown. Success notification screen 400 may include authorization information 402 and an OK button 404 displayed on user device 102 in response to successful response OTP validation. Authorization information 402 may include information identifying a service and indicating that authorization was successful. For example, authorization information 402 for a purchase transaction may comprise a service name request, a purpose, a time, a merchant, a merchant locator, and an amount. A user may press OK button 404 to dismiss success notification screen 400.

Figure 5:
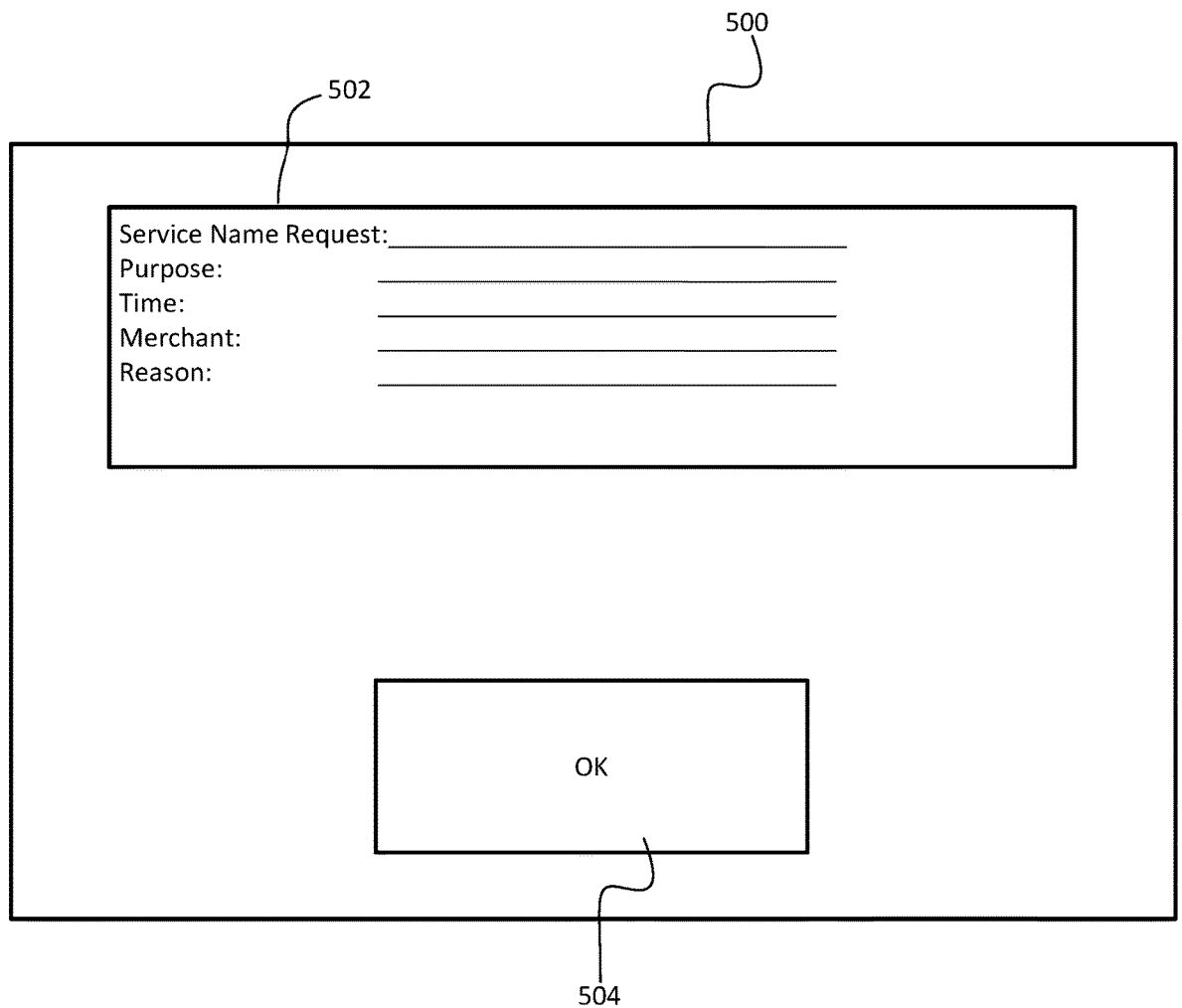
FIG. 5 illustrates an exemplary authentication success notification screen, in accordance with various embodiments.

With reference to FIG. 5, an exemplary failure notification screen 500 is shown, in accordance with various embodiments. Failure notification screen 500 may comprise failure information 502 and OK button 504 for display in response to a failed OTP response authentication. Failure information 502 may include information identifying the requesting service and an indication that the authentication failed. Failure information for a purchase transaction, for example, may include a service name request, a purpose, a time, a merchant, and a reason for failure.

Figure 6:
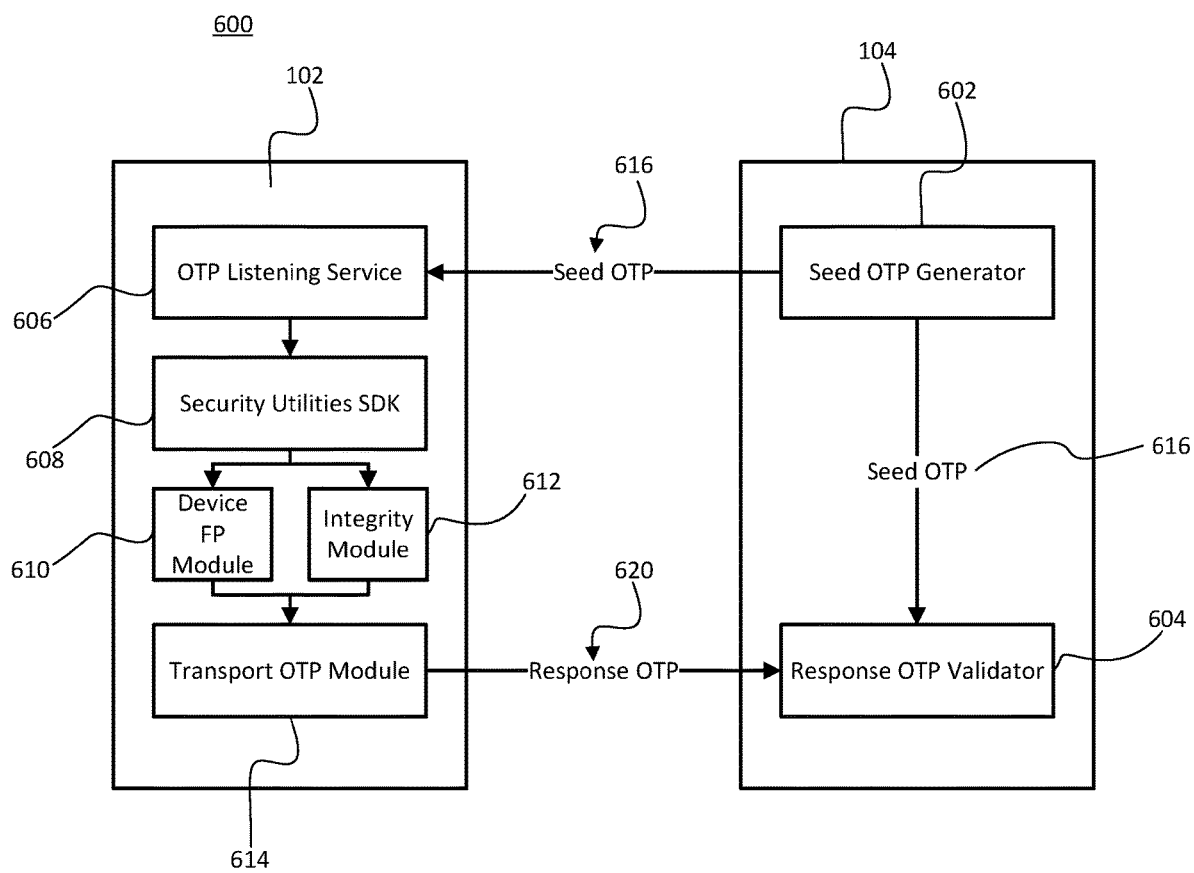
FIG. 6 illustrates an exemplary system comprising a user device, seed OTP provisioning server, and response OTP validation server in electronic communication for OTP authorization, in accordance with various embodiments.

With reference to FIG. 6, system 600 is shown for validating user device 102 using a one-time password. System 600 includes user device 102 and service provider 104. Service provider 104 may operate OTP authentication services including a seed OTP generator 602 and a response OTP validator 604. The OTP seed generator may generate seed OTP 616 in response to a request. Seed OTP 616 may be generated using a random number generator. The seed OTP may be sent to, and received by, an OTP listening service running on user device 102. The OTP listening service may wait for incoming seed OTP from service provider 104.

In various embodiments, a security utilities software development kit (SDK) 608 may run on user device 102 and be in communication with OTP listening service 606. Seed OTP 616 may be passed to security utilities SDK 608 for further processing to generate a response OTP. The security utilities SDK 608 may use device finger print from device finger print module 610 to apply a function to the seed OTP and generate response OTP 620. Any function may be applied to seed OTP 616 by user device 102 to generate response OTP 620. Functions that incorporate the device fingerprint may increase security by making the response OTP device bound. Integrity module may monitor device health and attest that OTP system components running on user device 102 have not been tampered with and are in good health. If integrity module detects that user device 102 has been tampered with then system 600 may abort the OTP validation process.

In various embodiments, response OTP 620 may be sent by transport OTP module 614 to response OTP validator 604 of service provider 104. Response OTP validator 604 may apply the same function to seed OTP 616 that user device 102 applied to seed OTP 616 to generate response OTP 620. In doing so, response OTP validator 604 may use the device fingerprint of user device 102, which may be received prior to service provider 104 sending the seed OTP 616 to user device 102.

Figure 7:
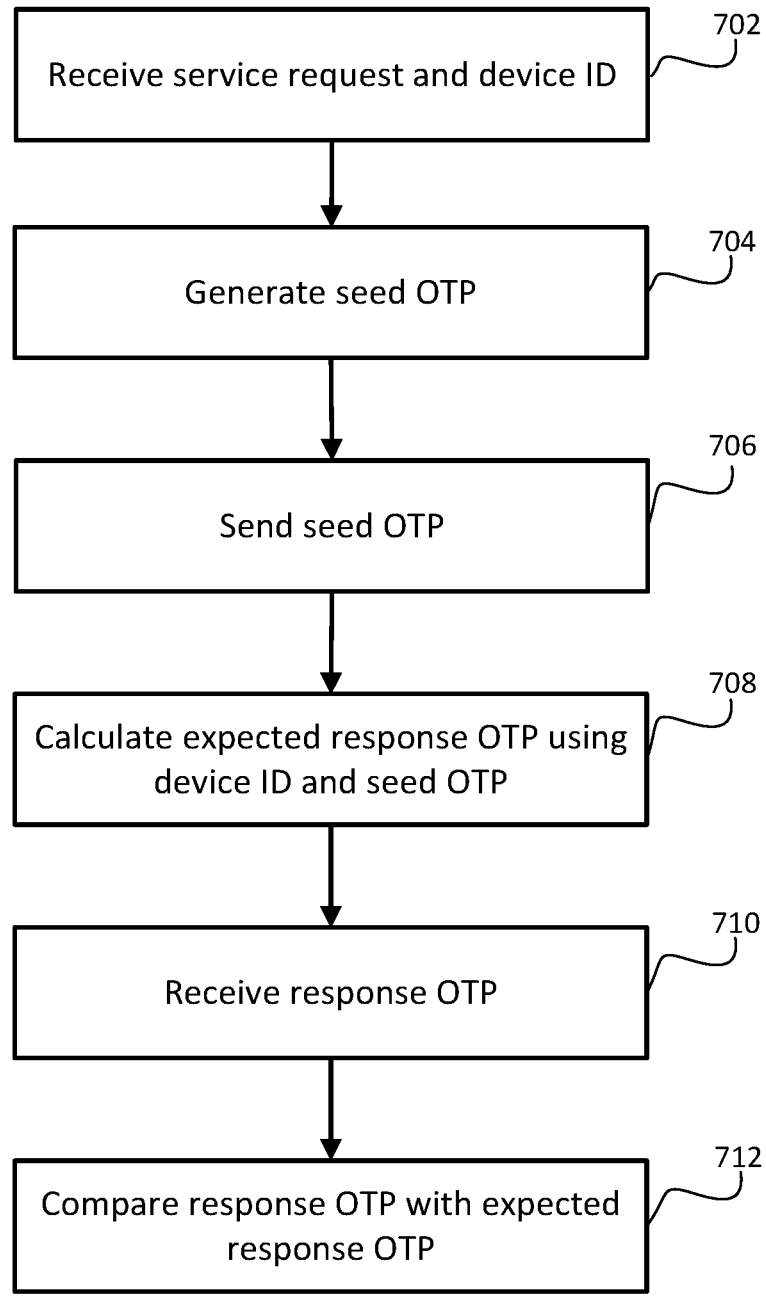
FIG. 7 illustrates an exemplary process for OTP authorization by a service provider, in accordance with various embodiments.

With reference to FIG. 7, an exemplary process 700 for OTP generation and validation by service provider 104 is shown, in accordance with various embodiments. Service provider 104 may receive a service request and device ID from user device 102 (Block 702). The service request may be a request for access to sensitive information such as transaction account information or personally identifiable information (PII) or a direct request for OTP validation. The device ID, which identifies user device 102, may be sent along with the service request or separately. The device ID may be used by service provider 104 in generating an expected response OTP for validation.

In various embodiments, service provider 104 may then generate a seed OTP (Block 704). The seed OTP may comprise a random number of a desired length generated in response to the OTP request. Seed OTP may be used one time for validation before it is discarded. For example, a seed OTP may be thousands of bytes in length without creating increased complexity for a user of user device 102. Service provider 104 may send the seed OTP to user device 102 (Block 706). Service provider 104 may then await a response from user device 102. The response may have a particular time during which the seed OTP is valid. For example, the seed OTP may be invalid 10 minutes after the seed OTP is sent. A response OTP generated from an invalid seed OTP may result in validation failure.

In various embodiments, service provider 104 may calculate an expected response OTP using the device ID and seed OTP (Block 708). The expected response OTP may be calculated by applying a function to the seed OTP. The function may include the device ID to ensure that a matching response comes from a device that has the same device ID (i.e., user device 102). The function may include any suitable function such as multiplication, concatenation, truncation, hashing, and/or any other deterministic function that may also be applied by user device 102.

In various embodiments, service provider 104 may receive a response OTP from user device 102 (Block 710). The response OTP may be calculated by user device in the same manner as the expected response OTP is calculated by service provider 104. Service provider 104 may then compare the response OTP with the expected response OTP (Block 712). Service provider 104 may signal authorization success in response to the response OTP matching the expected response OTP. Service provider 104 may signal authorization failure in response to the response OTP not matching the expected response OTP. A response OTP generated with a different algorithm than the algorithm applied by service provider 104 in calculating the expected response OTP may result in validation failure. Similarly, a response OTP generated from a different seed OTP than the seed OTP used by service provider 104 in calculating the expected response OTP may result in validation failure. Likewise, a response OTP (generated with a different device ID than the device ID applied by service provider 104 in calculating the expected response OTP) may result in validation failure.

The present disclosure provides a system, method, and computer program product for authenticating users an enhanced OTP system. By using a longer byte array for the OTP (i.e., longer than the typical 6-character length) the authorization techniques of the present disclosure may impede attackers and render guessing the OTP statistically prohibitive. The OTP systems in the present disclosure may further improve OTP security by issuing a device-bound OTP based on a device ID belonging to a known and/or registered device. In that regard, the OTP more accurately validates that a user is in possession of the registered device. Additionally, the push-button automation of the present OTP system tends to reduce frustration and time loss resulting from user error in copying an OTP manually and returning it for validation.

The phrases consumer, customer, user, account holder, account affiliate, account member or the like shall include any person, entity, business, government organization, business, software, hardware, machine associated with a transaction account, buys merchant offerings offered by one or more merchants using the account and/or who is legally designated for performing transactions on the account, regardless of whether a physical account is associated with the account. For example, the account member may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, and JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA®

FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, PALM®OS®, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, account, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart account"); a fob having a transponder and an RFID reader; and/or near field communication (NFC) technologies. For more information regarding NFC, refer to the following specifications all of which are incorporated by reference herein: ISO/IEC 18092/ ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

Phrases and terms similar to "internal data" or "personally identifiable information" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method comprising:
   receiving, by a processor, a service request, wherein the service request includes a device identifier of a user device or a device fingerprint of the user device;
   transmitting, by the processor, a seed one-time password (OTP) to the user device, wherein the seed OTP comprises a random number that is valid for a predetermined time period and is discarded after first use;
   receiving, by the processor, a response OTP generated by the user device, wherein the response OTP is different from the seed OTP;
   calculating, by the processor, an expected response OTP by applying a hash function to the seed OTP, wherein the hash function is based on the device identifier of the user device or the device fingerprint of the user device received from the service request;
   determining, by the processor, that the response OTP satisfies the expected response OTP; and
   sending, by the processor to the user device, a result in response to the determining operation.

2. The method of claim 1, further comprising generating, by the processor, the seed OTP.

3. The method of claim 1, further comprising transmitting, by the processor, the seed OTP to an OTP validation server.

4. The method of claim 1, wherein the response OTP is generated in response to an integrity module confirming that the user device is in good health based on the seed OTP being passed to a security utilities software development kit (SDK) on the user device.

5. The method of claim 1, wherein the response OTP is generated using the hash function.

6. The method of claim 1, wherein in response to receiving the result from the processor, the user device requests confirmation.

7. The method of claim 1, wherein the seed OTP is transmitted in response to receiving the service request.

8. The method of claim 1, wherein in response to receiving the result from the processor, the user device displays a success notification screen, wherein the success notification screen is displayed along with at least one of a service name request, a purpose, a time, a merchant, a merchant locator, or an amount.

9. The method of claim 1, wherein the response OTP is transmitted by the user device to the processor in response to an authorization button being selected.

10. The method of claim 1, wherein the seed OTP is transmitted to the user device with an authorization payload including at least one of a service identifier, a purpose, a time, a date, a merchant identifier, or an amount of the seed OTP for display with an authorization button.

11. The method of claim 1, wherein the response OTP is received from the user device via text message.

12. The method of claim 1, further comprising transmitting, by the processor, the seed OTP to the user device via text message.

13. The method of claim 1, wherein the seed OTP comprises a random number of at least 128 bytes in length.

14. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a service request, wherein the service request includes a device identifier of a user device or a device fingerprint of the user device;
transmitting, by the processor, a seed one-time password (OTP) to the user device, wherein the seed OTP comprises a random number that is valid for a predetermined time period and is discarded after first use;
receiving, by the processor, a response OTP generated by the user device, wherein the response OTP is different from the seed OTP;
calculating, by the processor, an expected response OTP by applying a hash function to the seed OTP, wherein the hash function is based on the device identifier of the user device or the device fingerprint of the user device;
determining, by the processor, that the response OTP satisfies the expected response OTP; and
sending, by the processor, a result in response to the determining operation.

15. The system of claim 14, wherein the response OTP is generated in response to an integrity module confirming that the user device is in good health based on the seed OTP being passed to a security utilities software development kit (SDK) on the user device.

16. The system of claim 14, wherein the response OTP is generated using the hash function.

17. The system of claim 14, wherein the seed OTP is transmitted in response to receiving the service request.

18. The system of claim 14, wherein the seed OTP comprises a random number of at least 128 bytes in length.

19. A method comprising:
transmitting, by a user computer to a host, a service request, wherein the service request includes a device identifier of the user computer or a device fingerprint of the user computer;
receiving, by the user computer and from a host, a seed one-time password (OTP), wherein the seed OTP comprises a random number that is valid for a predetermined time period and is discarded after first use;
generating, by the user computer, a response OTP, wherein the response OTP is different from the seed OTP; and
transmitting, by the user computer and to the host, the response OTP,
wherein the host calculates an expected response OTP by applying a hash function to the seed OTP, wherein the hash function is based on the device identifier of the user computer or the device fingerprint of the user computer,
wherein the host determines that the response OTP satisfies the expected response OTP; and
wherein the host sends a result in response to the host determining that the response OTP satisfies the expected response OTP.

20. The method of claim 19, wherein the seed OTP is received over a second communication channel from the host.

* * * * *